(12) United States Patent
Jeon

(10) Patent No.: US 7,307,676 B2
(45) Date of Patent: Dec. 11, 2007

(54) LIQUID CRYSTAL DISPLAY MODULE

(75) Inventor: Seong Man Jeon, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 330 days.

(21) Appl. No.: 10/963,595

(22) Filed: Oct. 14, 2004

(65) Prior Publication Data

US 2005/0110921 A1     May 26, 2005

(30) Foreign Application Priority Data

Nov. 21, 2003   (KR) .................. 10-2003-0082948

(51) Int. Cl.
*G02F 1/1335* (2006.01)
*F21V 7/04* (2006.01)
*H02H 5/04* (2006.01)

(52) U.S. Cl. .................. 349/64; 361/31; 361/26
(58) Field of Classification Search .................. 349/64; 361/31, 26
See application file for complete search history.

(56) References Cited

U.S. PATENT DOCUMENTS

| 6,474,836 | B1 * | 11/2002 | Konagaya | 362/231 |
| 6,491,411 | B2 * | 12/2002 | Itoh | 362/246 |
| 6,654,088 | B2 * | 11/2003 | Morishita et al. | 349/113 |
| 7,072,096 | B2 * | 7/2006 | Holman et al. | 359/298 |
| 2002/0057405 | A1 * | 5/2002 | Morishita et al. | 349/113 |
| 2004/0257493 | A1 * | 12/2004 | Lim | 349/64 |

* cited by examiner

*Primary Examiner*—Mike Qi
(74) *Attorney, Agent, or Firm*—McKenna Long & Aldridge LLP

(57) ABSTRACT

A liquid crystal display module arranged to improve brightness and light efficiency of a direct-below-type back light unit. The liquid crystal display module includes a plurality of lamps; a reflection plate arranged to accommodate the plurality of lamps; a plurality of first triangular protrusions protruded from the reflection plate between the lamps; a diffusion plate on the reflection plate; an optical film on the diffusion plate; and a liquid crystal display panel on the optical film.

14 Claims, 7 Drawing Sheets

LIQUID CRYSTAL DISPLAY MODULE

This application claims the benefit of Korean Patent Application No. P2003-82948 filed on Nov. 21, 2003, which is hereby incorporated by reference for all purposes as if fully set forth herein.

BACKGROUND OF THE INVENTION

1. Field of the Invention

The present invention relates to a liquid crystal display module. More particularly, the present invention relates to a liquid crystal display module capable of improving the brightness and light efficiency of a direct-below-type back light unit.

2. Discussion of the Related Art

Uses for liquid crystal display modules (hereinafter, LCM) have gradually increased due to the LCM's light weight, its thinness, and low power consumption. For example, the LCM may be used in an office automation device, audio/video devices and the like. The LCM adjusts a transmittance quantity of a light beam in accordance with an image signal applied to a matrix of a plurality of control switches to thereby display desired pictures on a screen.

Because the LCM is not a spontaneous light-emitting display device, the LCM needs a back light unit as a light source. There are two types of back light units for the LCM, i.e., a direct-below-type and a light guide plate-type.

The direct-below-type LCM has a plurality of lamps arranged in series below the liquid crystal panel. A diffusion plate is installed between the lamps and the liquid crystal panel and maintains a gap between the lamps and the liquid crystal panel. The light guide plate-type LCM has a lamp installed on the outside of the light guide plate, and irradiates light from the lamp to the liquid crystal display panel using a transparent light guide plate.

In FIG. 1, a related art liquid crystal display module includes: a plurality of lamps 12, placed in parallel with each other, for generating light; a reflection plate (or a lamp housing) 10 for accommodating the lamps 12; a diffusion plate 16 for covering an aperture part of the lamp housing 10; an optical film 18 sequentially stacked on the diffusion plate 16; and a liquid crystal display panel 6 arranged on the optical film 18.

The liquid crystal display panel 6 includes an upper substrate 3 and a lower substrate 5. Liquid crystal materials are injected between the upper substrate 3 and the lower substrate 5. The liquid crystal display panel 6 is provided with a spacer (not shown) for maintaining a gap between the upper substrate 3 and the lower substrate 5. The upper substrate 3 of the liquid crystal display panel 6 is provided with a color filter, a common electrode and a black matrix (which are not shown). Signal lines such as a data line and a gate line (not shown) are formed on the lower substrate 5 of the liquid crystal display panel 6. A thin film transistor (TFT) is formed at a crossing of the data line and the gate line. The TFT switches a data signal to be transmitted from the data line to the liquid crystal cell in response to a scanning signal (i.e., a gate pulse) from the gate line. A pixel electrode is formed at a pixel area defined between the data line and the gate line. A pad area is formed in one side of the lower substrate 5 and is connected to each of the data line and the gate line. A tape carrier package (not shown) having a driver integrated circuit mounted thereon to apply a driving signal to the TFT is attached on the pad area. The tape carrier package applies a data signal and the scanning signal from the driver integrated circuit to each of the data line and the gate line.

An upper polarizing sheet is attached on the upper substrate 3 of the liquid crystal display panel 6 and a lower polarizing sheet is attached on of the rear side of the lower substrate 5 of the liquid crystal display panel 6. The upper and lower polarizing sheets function to enlarge a viewing angle of a picture displayed by a liquid crystal cell matrix.

Each of the lamps 12 includes a glass tube, inert gases filled within the glass tube, and a cathode and an anode installed at opposite ends of the glass tube. The inner wall of the glass tube is coated with phosphors.

When an alternating-current voltage from an inverter (not shown) is applied to the anode and the cathode of each lamp 12, electrons are emitted from the cathode. The emitted electrons collide with the inert gases contained in the glass tube, and the number of electrons exponentially grows. The increased electrons generate electric currents in the glass tube, and excite the inert gases (For example, Ar, Ne) to generate energy. The energy excites mercury which emits ultraviolet rays. The ultraviolet rays collide with the phosphors coated on the inner wall of the glass tube to generate visible light.

The reflection plate 10, made of an aluminum material, prevents leakage of the visible light emitted from each of the lamps 12, and reflects the visible light that reaches the sides and rear of the reflection plaTe to the front side thereof, i.e., to the diffusion plate 16, to increase the efficiency of light emitted from the lamps 12.

The diffusion plate 16 causes the light emitted from the lamps 12 to go toward the liquid crystal panel 6 with a wide range of incident angle. The diffusion plate 16 includes a transparent resin film whose both surfaces are coated with light-diffusion materials.

The optical film 18 increases the efficiency of light outgoing from the diffusion plate 16 to irradiate the light to the liquid crystal display panel 6.

As mentioned above, the related art LCM uses a plurality of lamps 12 to generate a uniform light, and then irradiates the light to the liquid crystal panel 6 to display pictures thereon. However, the related art LCM also uses a plurality of the lamps 12 to improve efficiency and brightness of the light irradiated to the liquid crystal display panel 6. Accordingly, in the related art LCM, when the number of the lamps 12 is reduced, a problem occurs in which brightness and efficiency are deteriorated.

SUMMARY OF THE INVENTION

Accordingly, the present invention is directed to a liquid crystal display module that substantially obviates one or more problems due to limitations and disadvantages of the related art.

An advantage of the present invention is to provide a liquid crystal display module capable of improving a brightness and a light efficiency of a direct-below-type back light unit.

Another advantage of the present invention is to provide a liquid crystal display module capable of reducing a number of lamps by improving a brightness and a light efficiency of a direct-below-type back light unit.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module includes: a plurality of lamps; a reflection plate arranged to accommodate the plurality of lamps; a plurality of first triangular protrusions protruded from the reflection plate between the lamps; a diffusion plate on the reflection plate; an optical film on the diffusion plate; and a liquid crystal display panel stacked on the optical film.

It is to be understood that both the foregoing general description and the followed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Hereinafter, the embodiments of the present invention will be described in detail with reference to FIGS. 2 to 7.

Figure 1:
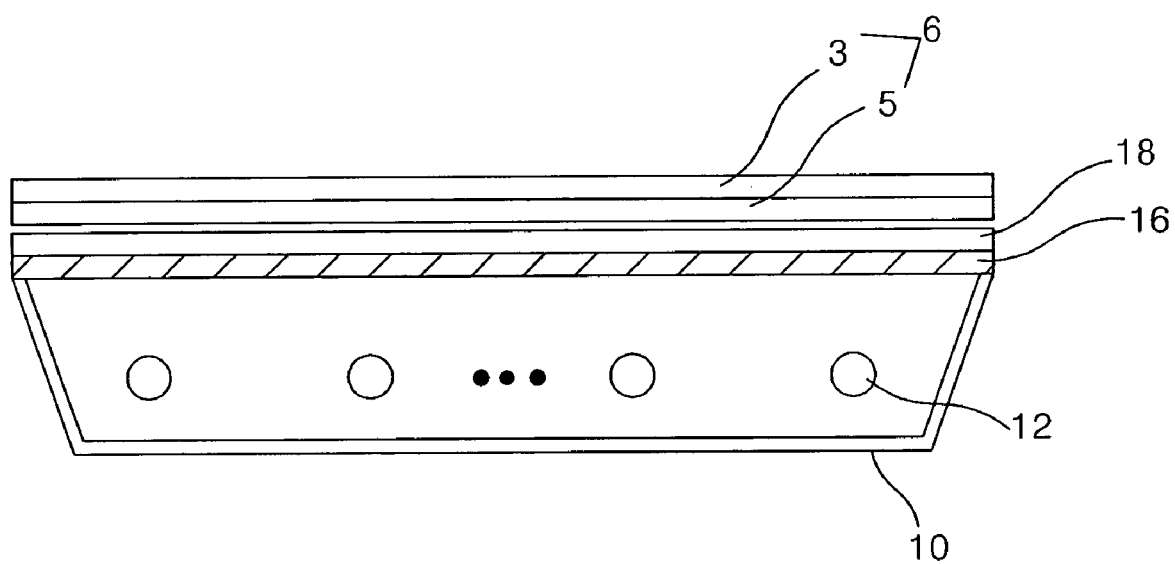
FIG. 1 is a sectional view illustrating a related art liquid crystal display module.
Figure 2:
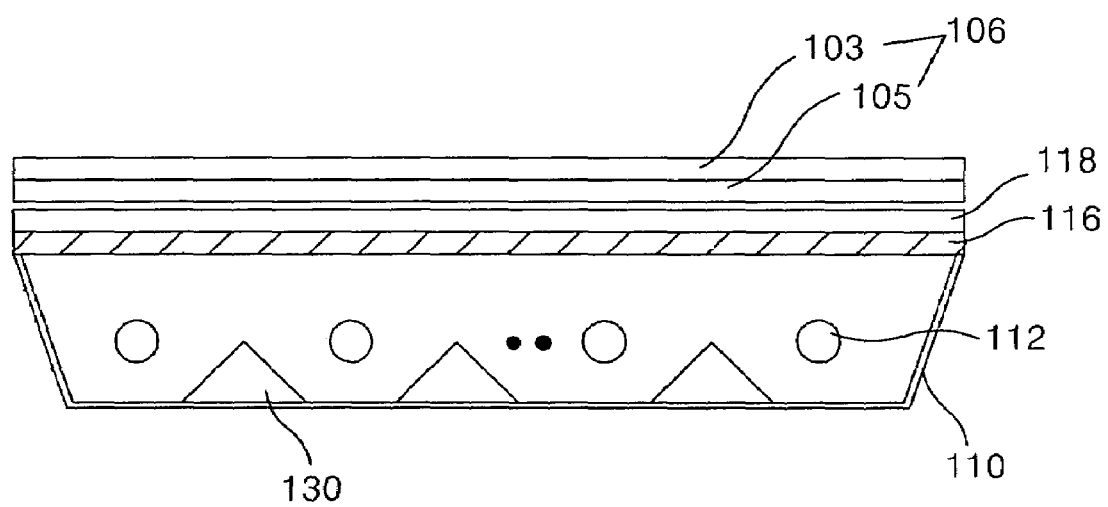
FIG. 2 is a sectional view illustrating a liquid crystal display module according to a first embodiment of the present.

In FIG. 2, a liquid crystal display module according to a first embodiment of the present invention includes: a plurality of lamps 112, placed in parallel with each other, for generating light; a reflection plate (or a lamp housing) 110 for accommodating the lamps 112; a diffusion plate 116 for covering an aperture part of the lamp housing 110; an optical film 118 sequentially stacked on the diffusion plate 116; and a liquid crystal display panel 106 arranged on the optical film 118.

The liquid crystal display panel 106 includes an upper substrate 103 and a lower substrate 105. Liquid crystal materials are injected between the upper substrate 103 and the lower substrate 105. The liquid crystal display panel 106 includes a spacer (not shown) for maintaining a gap between the upper substrate 103 and the lower substrate 105. The upper substrate 103 of the liquid crystal display panel 106 includes a color filter, a common electrode and a black matrix (which are not shown). Signal lines such as a data line and a gate line (not shown) are formed on the lower substrate 105 of the liquid crystal display panel 106. A thin film transistor (TFT) is formed at a crossing of the data line and the gate line. The TFT switches a data signal to be transmitted from the data line to the liquid crystal cell in response to a scanning signal (i.e., a gate pulse) from the gate line. A pixel electrode is formed at a pixel area between the data line and the gate line. A pad area is formed in one side of the lower substrate 105 and is connected to each of the data line and the gate line. A tape carrier package (not shown), having a driver integrated circuit mounted thereon for applying a driving signal to the TFT, is attached on the pad area. The tape carrier package applies a data signal and the scanning signal from the driver integrated circuit to each of the data line and the gate line.

An upper polarizing sheet may be attached on the upper substrate 103 of the liquid crystal display panel 106 and a lower polarizing sheet may be attached on the rear side of the lower substrate 105 of the liquid crystal display panel 106. The upper and lower polarizing sheets function to enlarge a viewing angle of a picture displayed by a liquid crystal cell matrix.

Each of the lamps 112 includes a glass tube, inert gases filled within the glass tube, and a cathode and an anode installed at the opposite ends of the glass tube. The inner wall of the glass tube is coated with phosphors.

When an alternating-current voltage from an inverter (not shown) is applied to the anode and the cathode of each lamp 112, electrons are emitted from the cathode. These emitted electrons collide with the inert gases contained in the glass tube to exponentially increase the number of electrons. The increased electrons generate electric currents in the glass tube, and excite the inert gases (for example, Ar, Ne) to generate energy. The energy excites mercury which emits ultraviolet rays. The ultraviolet rays collide with the phosphors coated on the inner wall of the glass tube to generate visible light.

The reflection plate 110, which is made of, for example, a micro-forming polyethyleneterphthalate (MCPET) material, prevents leakage of the visible light emitted from each of the lamps 112, and reflects the visible light that reaches the sides and rear of the reflection plate 110 to the front side thereof, i.e., to the diffusion plate 116, to increase the efficiency of light emitted from the lamps 112.

Figure 3:
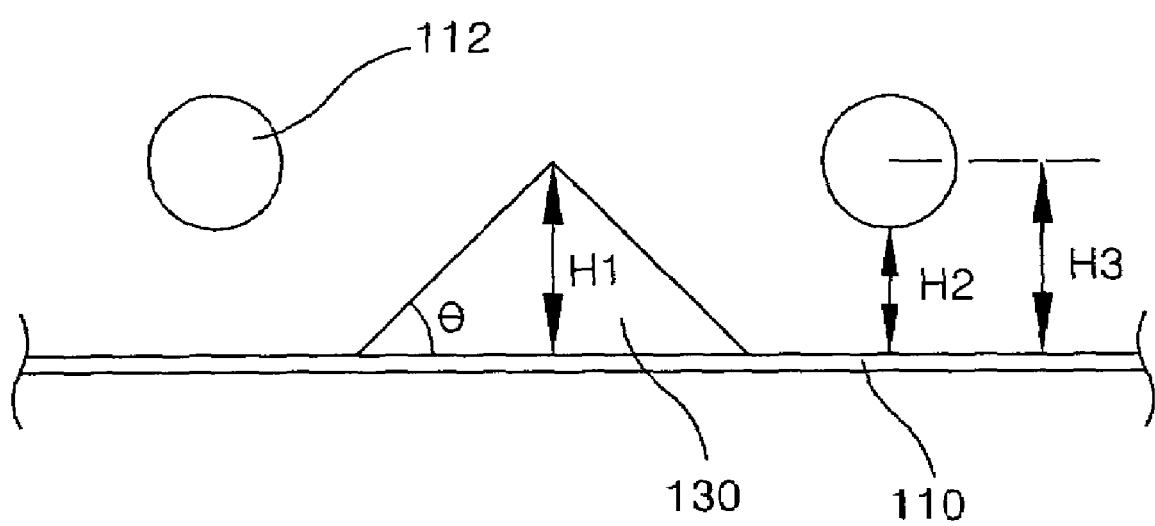
FIG. 3 is a sectional view a structure of the triangular protrusion shown in FIG. 2.

A plurality of triangular protrusions 130 protrude from a bottom surface of the reflection plate 110 toward the diffusion plate 116. A vertex of the respective triangular protrusions 130 is located at a middle point between the lamps 112 and the bottom surface of the reflection plate as shown in FIG. 3.

Each of the triangular protrusions 130 reflects the light incident from the lamps 112 toward the diffusion plate 116 to thereby improve an efficiency of the light. In accordance with the present invention, a height H1 of the triangular protrusion 130, a distance H3 between the middle point between the lamps and the reflection plate 110, and an angle $\Theta$ of both lateral sides of the triangular protrusion 130 may be adjusted to optimize the efficiency of the light reflected from the triangular protrusion 130 and the reflection plate 110.

Figure 4:
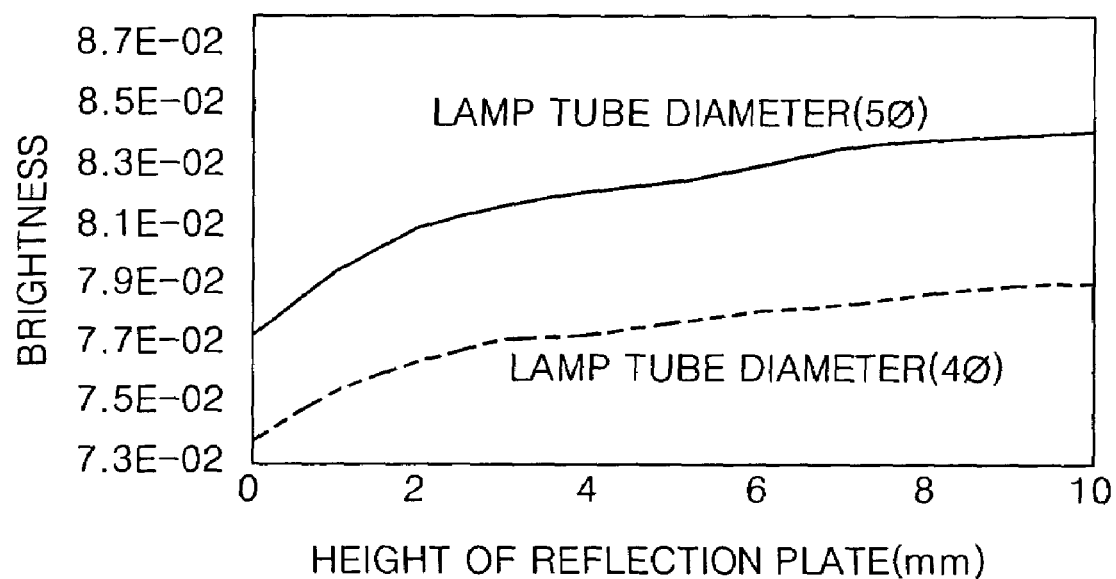
FIG. 4 is an experimental graph representing a brightness in accordance with a height of the triangular protrusion shown in FIG. 2.

According to an experiment of a change of a brightness of light depending on the height H1 of the triangular protrusion 130 when the lamps have tubes with diameters of 40 mm and 50 mm, as shown in FIG. 4, the brightness of the light depending on the height H1 of the triangular protrusion 130 increases as the height H1 of the triangular protrusions 130 is further increased. Accordingly, the height H1 of the triangular protrusion 130 may be set to be higher than a height H2 between an end of each lamp 112 and the bottom surface of the reflection plate 110. A maximum height H1 may be set to be adjacent to the diffusion plate 116. However, in case that the height H1 of the triangular protrusion 130 is adjacent to the diffusion plate 116, heat generated from the lamps 112 is convected and not dissipated. To overcome the heat build-up, the height H1 of the triangular protrusions 130 may be set to be adjacent to the diffusion plate 116 within an enough range to dissipate the heat.

Figure 5:
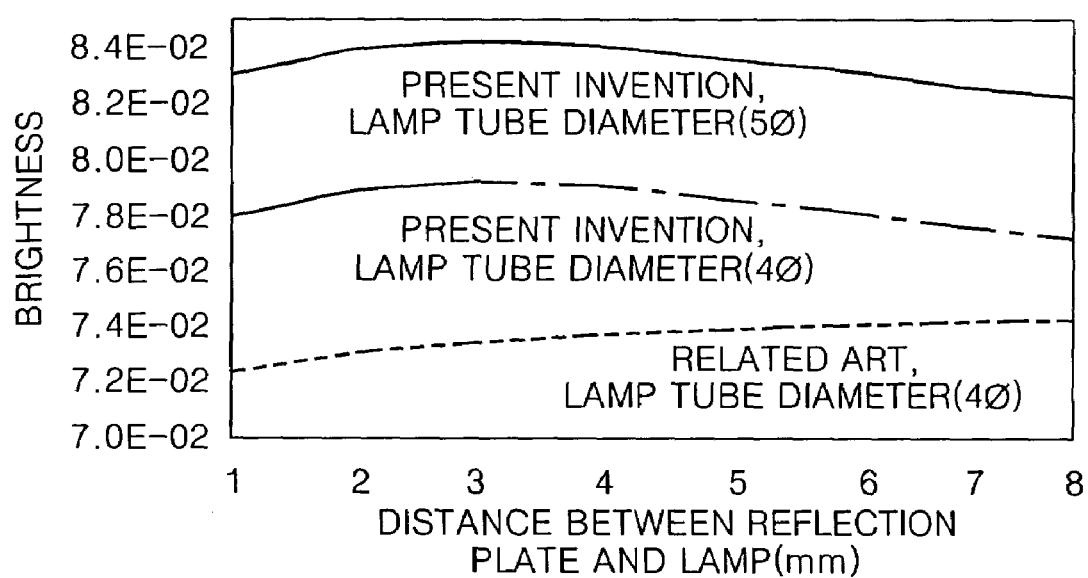
FIG. 5 is an experimental graph representing a change of a brightness depending on a distance between the reflection plate and the lamp shown in FIG. 2.

The distance H3 between the middle point between the lamps 112 and the bottom surface of the reflection plate 110 may be set to a distance of about 3 mm to 10 mm. Based upon an experiment of a change of a brightness of light depending on the height H3 of the triangular protrusion 130 when the lamps have tubes with diameters of 40 mm and 50 mm, as shown in FIG. 5, the brightness of the light is maximized when the distance H3 between the middle point and the reflection plate 110 is about 3 mm.

Figure 6:
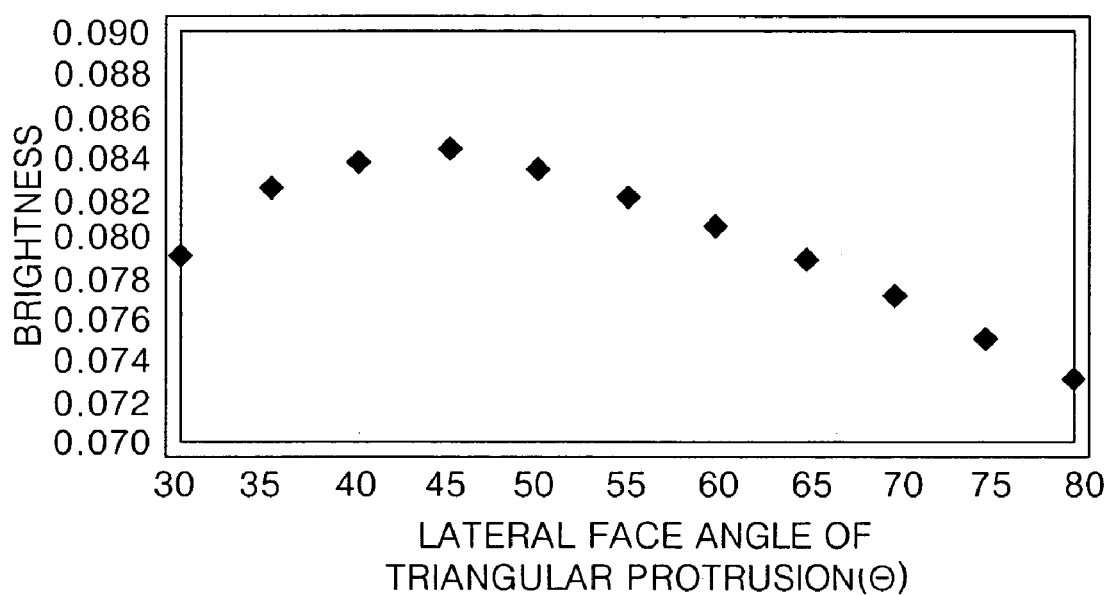
FIG. 6 is a an experimental graph representing a change of a brightness depending on a lateral face angle of the triangular protrusion shown in FIG. 2.

The angle $\ominus$ of both lateral sides of the triangular protrusion 130 may be set in a range of about 30° to 80°. In other words, if the angle $\ominus$ of both lateral sides of the triangular protrusion becomes larger than a reference angle 45° as shown in FIG. 6, because the angle in which most of the light emitted from the lamps 112 is incident on an inclined surface of the triangular protrusion 130 comes close to perpendicular, an amount of the light reflected from the inclined surface and progressed toward a front surface of the diffusion plate 116 is decreased. Thus, a brightness of the front surface is relatively reduced. Further, if the angle $\ominus$ of both lateral sides of the triangular protrusion becomes smaller than 45°, the light emitted from the lamps 112 is gathered to the front surface of the diffusion plate 116 by virtue of the inclined surface of the triangular protrusions 130. As a result, an amount of the light reflected from the inclined surface and progressed toward a front surface of the diffusion plate 116 is decreased as in the related art reflection plate. Thus, a brightness of the front surface is relatively reduced. Accordingly, when the angle $\ominus$ of both lateral sides of the triangular protrusion 130 has a range of about 30° to 80°. The brightness is maximized when the angle $\ominus$ is about 45°.

The diffusion plate 116 causes the light emitted from the lamps 112 to be directed toward the liquid crystal panel 106 so that the light is incident in a wide range of angles. The diffusion plate 116 includes a transparent resin film in which both surfaces are coated with light-diffusion materials.

The optical film 118 increases the efficiency of the light from the diffusion plate 116 to irradiate the light to the liquid crystal display panel 106.

As mentioned above, the LCM according to the first embodiment of the present invention uses a plurality of lamps 112 to generate a uniform light, and then irradiates the uniform light to the liquid crystal panel 106 to display pictures thereon.

The LCM according to the first embodiment of the present invention uses the triangular protrusions 130 protruded from the reflection plate 110 to reflect the incident light from the lamps 112 toward the diffusion plate 116. Thus, it is possible to improve the efficiency and the brightness of the light. Accordingly, because the LCM according to the first embodiment of the present invention uses the triangular protrusions 130 to improve the efficiency and the brightness of the light, a loss in the brightness can be compensated even when the number of lamps 112 is reduced.

Figure 7:
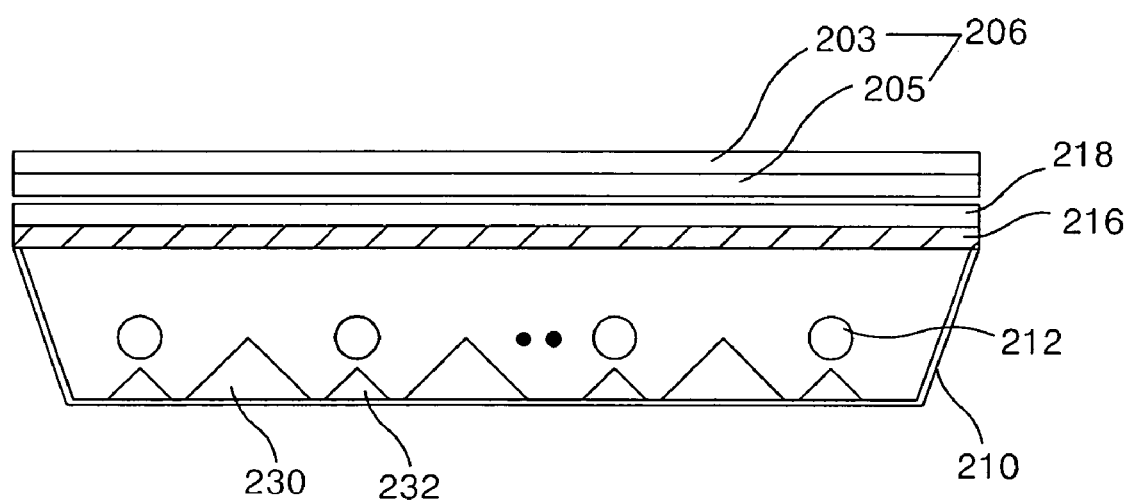
FIG. 7 is a sectional view illustrating a liquid crystal display module according to a second embodiment of the present invention.

In FIG. 7, a liquid crystal display module according to a second embodiment of the present invention includes: a plurality of lamps 212, placed in parallel with each other, for generating light; a reflection plate 210 for accommodating the lamps 212; a diffusion plate 216 for covering an aperture part of the reflection plate 210; a plurality of first triangular protrusions 230 protruded toward the diffusion plate 216 between the plurality of lamps 212 from the reflection plate 210; a plurality of second triangular protrusions 232 protruded toward the middle of the respective plurality of lamps 212 from the reflection plate 210; an optical film 218 stacked on the diffusion plate 216; and a liquid crystal display panel 206 arranged on the optical film 218.

Because the lamps 212, the reflection plate 210, the diffusion plate 216, the optical film 218 and the liquid crystal display panel 206 are similar to the LCM discussed with respect to the first embodiment, a detailed explanation therefor will be replaced with the explanation for the LCM according to the second embodiment of the present described above.

Each of the first triangular protrusions 230 are protruded in a shape of a triangle toward the diffusion plate 216 from a bottom surface of the reflection plate 210. A vertex of the first triangular protrusion 230 corresponds to a middle portion located between the lamps 212 similar to that shown in FIG. 3. The first triangular protrusion 230 reflects light incident from the lamps 212 toward the diffusion plate 216 to improve an efficiency of the light. At this time, a height H1 of the first triangular protrusion 230, a distance H3 between the middle portion between the lamps 212 and the reflection plate 210, and an angle $\ominus$ of both of the lateral sides of the first triangular protrusion 230 may be adjusted to optimize the efficiency of the light from the first triangular protrusion 230 and the reflection plate 210.

In an experiment regarding a change of a brightness of the light based upon the height H1 of the first triangular protrusion 230 when the lamps have tubes with a diameter of 40 mm and 50 mm, as shown in FIG. 4, the brightness of the light based upon the height H1 of the first triangular protrusion 230 increases as the height H1 of the first triangular protrusion 230 is increased. Accordingly, the height H1 of the first triangular protrusion 230 may be set higher than a height H2 between the end of each lamp 212 and the reflection plate 210. For example, the maximum height H1 may be set to be adjacent to the diffusion plate 216. However, in the case when the height H1 of the first triangular protrusion 230 is adjacent to the diffusion plate 216, heat generated from the lamps 212 is convected rather than dissipated. To overcome this problem, the height H1 of the first triangular protrusion 230 may be set to be adjacent to the diffusion plate 216 within an enough range to dissipate the heat.

Meanwhile, the distance H3 between the middle of each lamp 212 and the reflection plate 210 may be set to a distance of about 3 mm to 10 mm. In other words, in an experiment regarding a change of a brightness of light based upon the height H3 of the first triangular protrusion 230 when the lamps 212 have tubes with a diameter of 40 mm and 50 mm, as shown in FIG. 5, the brightness of the light is maximized when the distance H3 between the middle of each lamp 212 and the reflection plate 210 is about 3 mm.

Meanwhile, the angle $\ominus$ of both lateral sides of the first triangular protrusions 230 may be set in a range of about 30° to 80°. In other words, if the angle $\ominus$ of both lateral sides of the triangular protrusion 230 becomes larger than 45° as shown in FIG. 6, the angle in which most of the light emitted from the lamps 212 is incident on an inclined surface of the first triangular protrusion 230 nears an amount of the light reflected from the inclined surface and then progresses toward a front surface of the diffusion plate 216. decrease. Thus, a brightness of the front surface is relatively reduced. Further, if the angle ⊖ of both lateral sides of the triangular protrusion 230 becomes smaller than 45°, the light emitted from the lamps 212 is gathered towards the front surface of the diffusion plate 216 by virtue of the inclined surface of the first triangular protrusions 230. As a result, an amount of the light reflected from the inclined surface and then progressed toward a front surface of the diffusion plate 216 is decreased. Thus, a brightness of the front surface is relatively reduced. As a result, the angle ⊖ of both lateral sides of the first triangular protrusion 230 may have a range of about 30° to 80°, with a maximum brightness when the angle ⊖ is about 45°.

A vertex of the respective second triangular protrusion 232 may correspond to a middle of the respective lamps 212. The second triangular protrusion 232 has a shape and a structure identical to that of the first triangular protrusions 230 described above. A height of the second triangular protrusion 232 may be set to be between the reflection plate 210 and an end of the lamps 212. The second triangular protrusion 232 reflects the light that is emitted from the lamps 212 and progressed toward the reflection plate 210 toward the diffusion plate 216.

As mentioned above, the LCM according to the second embodiment of the present invention generates a uniform light to irradiate the light to the liquid crystal panel 206 using a plurality of the lamps 212 to display a desired picture.

The LCM according to the second embodiment of the present invention employs the first triangular protrusions 230 and the second triangular protrusions 232 protruded in a shape of triangle from the reflection plate 210 to reflect the light progressing from the lamps 212 to the reflection plate 210, toward the diffusion plate 216. Thus, it is possible to improve the efficiency and the brightness of the light. Accordingly, because the LCM of the second embodiment of the present invention employs the first triangular protrusions 230 and the second triangular protrusions 232 to improve the efficiency and the brightness of the light, a loss of the brightness can be compensated even when the number of lamps 212 is reduced.

Further, the present invention uses the first and the second triangular protrusions to improve the efficiency and the brightness of the light irradiated to the liquid crystal display panel, thus, it is possible to reduce the number of the lamps.

In alternate embodiments of the present invention, one of ordinary skill in the art would recognize the triangular protrusions may also include other geometric shapes including, for example, trapezoids and hexagons.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module comprising:
a plurality of lamps;
a reflection plate arranged to accommodate the plurality of lamps;
a plurality of first triangular protrusions protruded from the reflection plate between the lamps;
a diffusion plate on the reflection plate;
an optical film on the diffusion plate; and
a liquid crystal display panel on the optical film;
wherein each of the first triangular protrusions has a height of at least about 3 mm and is adjacent a rear surface of the diffusion plate.

2. The liquid crystal display module according to claim 1, further comprising a plurality of second triangular protrusions protruded from the reflection plate, wherein a vertex of each of the second triangular protrusions corresponds to a middle portion of each of the respective lamps.

3. The liquid crystal display module according to claim 2, wherein each of the second triangular protrusions has a height of at least about 3 mm and is adjacent an end of the respective lamps facing the reflection plate.

4. The liquid crystal display module according to claim 2, wherein an angle of lateral sides of the respective first triangular protrusions and the respective second triangular protrusions is in a range of about 30° to 80°.

5. The liquid crystal display module according to claim 2, wherein an angle of lateral sides of the first and second triangular protrusions is about 45°.

6. The liquid crystal display module according to claim 1, wherein an angle of lateral sides of the first triangular protrusion is about 45°.

7. The liquid crystal display module according to claim 1, wherein a distance between the reflection plate and a middle portion of the respective lamps is in a range of about 3 mm to 10 mm.

8. The liquid crystal display module according to claim 1, wherein a material for the reflection plate includes a micro-forming polyethyleneterphthalate (MCPET).

9. The liquid crystal display module according to claim 1, wherein an angle of lateral sides of the first triangular protrusions is in a range of about 30° to 80°.

10. A liquid crystal display module comprising:
a plurality of lamps;
a reflection plate arranged to accommodate the plurality of lamps;
a plurality of first protrusions protruded from the reflection plate between the lamps;
a diffusion plate on the reflection plate;
an optical film on the diffusion plate; and
a liquid crystal display panel on the optical film;
wherein each of the first protrusions has a height of at least about 3 mm and is adjacent a rear surface of the diffusion plate.

11. The liquid crystal display module of claim 10, wherein the plurality of first protrusions are triangular.

12. The liquid crystal display module of claim 10, further comprising a plurality of second protrusions.

13. The liquid crystal display module of claim 12, wherein the plurality of second protrusions are at least one of triangular, trapezoidal and hexagonal.

14. The liquid crystal display module of claim 10, wherein a material for the reflection plate includes a micro-forming polyethyleneterphthalate (MCPET).

* * * * *